(12) United States Patent
Au et al.

(10) Patent No.: US 8,804,835 B2
(45) Date of Patent: *Aug. 12, 2014

(54) FAST MOTION ESTIMATION IN SCALABLE VIDEO CODING

(75) Inventors: Oscar Chi Lim Au, Hong Kong (CN); Sui Yuk Lam, Hong Kong (CN)

(73) Assignee: Tsai Sheng Group LLC, Wilmington, DE (US)

( * ) Notice: Subject to any disclaimer, the term of this patent is extended or adjusted under 35 U.S.C. 154(b) by 260 days.

This patent is subject to a terminal disclaimer.

(21) Appl. No.: 13/476,978

(22) Filed: May 21, 2012

(65) Prior Publication Data

US 2012/0230416 A1    Sep. 13, 2012

Related U.S. Application Data

(63) Continuation of application No. 12/246,111, filed on Oct. 6, 2008, now Pat. No. 8,204,125.

(60) Provisional application No. 60/990,774, filed on Nov. 28, 2007.

(51) Int. Cl.
  *H04N 7/12* (2006.01)
  *H04N 7/36* (2006.01)
  *H04N 7/30* (2006.01)
  *H04N 7/50* (2006.01)
  *H04N 7/26* (2006.01)

(52) U.S. Cl.
  CPC ... *H04N 19/00787* (2013.01); *H04N 19/00606* (2013.01); *H04N 19/00818* (2013.01); *H04N 19/00121* (2013.01); *H04N 19/0043* (2013.01); *H04N 19/00696* (2013.01); *H04N 19/00781* (2013.01)

USPC ........... 375/240.16; 375/240.12; 375/240.13; 375/240.14; 375/240.15; 382/236; 382/237; 382/238

(58) Field of Classification Search
  USPC ...................................... 375/240.16
  See application file for complete search history.

(56) References Cited

U.S. PATENT DOCUMENTS

2007/0154103 A1 *   7/2007   Au et al. .................... 382/236

OTHER PUBLICATIONS

Flierl. Video Coding with Lifted Wavelet Transforms and Frame-Adaptive Motion Compensation. In: EURASIP VLBV, Madrid, Spain, Sep. 2003. http://infoscience.epfl.ch/record/86963. Last accessed Sep. 24, 2008, 9 pages.

Wong, et al. Enhanced Predictive Motion Vector Field Adaptive Search Technique (E-PMVFAST)—Based on Future MV Prediction. In: IEEE International Conference on Multimedia and Expo (ICME) 2005. http://ieeexplore.ieee.org/iel5/10203/32544/01521524.pdf.

(Continued)

*Primary Examiner* — Longbit Chai
(74) *Attorney, Agent, or Firm* — Amin, Turocy & Watson, LLP

(57) ABSTRACT

Scalable Video Coding is recently attracting attentions due to its high flexibility. The current H.264/AVC scalable extension has adopted the Motion Compensated Temporal Filter (MCTF) framework to provide temporal scalability. In this paper, described is another fast motion estimation (ME) algorithm based on the MCTF framework. Simulation results show that the herein described algorithm can reduce the encoding complexity significantly while maintaining similar bit rate and PSNR, comparing with existing fast ME algorithms implemented in the reference software.

25 Claims, 12 Drawing Sheets

(56) References Cited

OTHER PUBLICATIONS

Li, et al. Adaptively Weighted Update Steps Using Chrominance for Scalable Video Coding. IEEE Workshop on Signal Processing Systems Design and Implementation, 2005. http://ieeexplore.ieee.org/iel5/10549/33371/01579952.pdf?tp=&arnumber=1579952&isnumber=33371. Last accessed Sep. 26, 2008, 6 pages.

Feng, et al. Energy distributed update steps (EDU) in lifting based motion compensated video coding, International Conference on Image Processing ICIP'04, Oct. 2004. http://ieeexplore.ieee.org/iel5/9716/30679/01421550.pdf?tp=&arnumber=1421550&isnumber=30679. Last accessed Sep. 26, 2008, 4 pages.

Chen, et al. Improvement of the update step in JSVM, ISO/IEC JTC1/SC29/WG11, JVT-O030, Busan, KR, Apr. 2005 http://wftp3.itu.int/av-arch/jvt-site/2005_04_Busan/JVT-O030.doc. Last accessed Sep. 26, 2008, 7 pages.

Wang, et al. Simplified Update Step Operation for MCTF, ISO/IEC JTC1/SC29/WG11, JVT-P052, Poznan, Poland, Jul. 2005. http://wftp3.itu.int/av-arch/jvt-site/2005_07_Poznan/JVT-P052r1.doc. Last accessed Sep. 26, 2008, 11 pages.

Ohm. Three-dimensional Subband Coding with Motion Compensation, IEEE Trans. Image Processing, vol. 3, No. 5, pp. 559-571, Sep. 1994. http://ieeexplore.ieee.org/iel4/83/7881/00334985.pdf?tp=&arnumber=334985&isnumber=7881. Last accessed Sep. 26, 2008, 13 pages.

A. M. Tourapis, O. C. Au, M. L. Liou, Fast Block Matching Motion Estimation using Predictive Motion Vector Field Adaptive Search Technique (PMVFAST), ISO/IEC JTC1/SC29/WG11, MPEG2000/M5866, Noordwijkerhout, NL, Mar. 2000.

OA dated Nov. 2, 2011 for U.S. Appl. No. 12/246,111, 21 pages.

\* cited by examiner

| | Top | Top Right | Top-Right-Right |
|---|---|---|---|
| Left | Current Block | Median Future | |

FIG. 3

FAST MOTION ESTIMATION IN SCALABLE VIDEO CODING

CROSS-REFERENCE TO RELATED APPLICATIONS

The present application is a continuation of U.S. patent application Ser. No. 12/246,111, entitled "FAST MOTION ESTIMATION IN SCALABLE VIDEO CODING", filed on Oct. 6, 2008, that claims the benefit of U.S. Provisional Application Ser. No. 60/990,774, filed on Nov. 28, 2007, entitled "FAST MOTION ESTIMATION IN SCALABLE VIDEO CODING", the entirety of which both are incorporated herein by reference.

TECHNICAL FIELD

The subject disclosure relates to efficient motion estimation techniques for scalable coding of video data.

BACKGROUND

Jointly developed by and with versions maintained by the ISO/IEC and ITU-T standards organizations, H.264, a.k.a. Advanced Video Coding (AVC) and MPEG-4, Part 10, is a commonly used video coding standard that was designed in consideration of the growing need for higher compression of moving pictures for various applications such as, but not limited to, digital storage media, television broadcasting, Internet streaming and real-time audiovisual communication. H.264 was designed to enable the use of a coded video representation in a flexible manner for a wide variety of network environments. H.264 was further designed to be generic in the sense that it serves a wide range of applications, bit rates, resolutions, qualities and services.

The use of H.264 allows motion video to be manipulated as a form of computer data and to be stored on various storage media, transmitted and received over existing and future networks and distributed on existing and future broadcasting channels. In the course of creating H.264, requirements from a wide variety of applications and associated algorithmic elements were integrated into a single syntax, facilitating video data interchange among different applications.

Compared with previous coding standards MPEG2, H.263, H.263+ and MPEG-4, H.264/AVC possesses better coding efficiency over a wide range of bit rates by employing sophisticated features such as using a rich set of coding modes. In this regard, by introducing many new coding techniques, higher coding efficiency can be achieved. To achieve such a high coding efficiency, H.264 is equipped with a set of tools that enhance prediction of content at the cost of additional computational complexity.

A macro-block (MB) is a term used in video compression as a standardized sub-size of image frames, i.e., image frames can be broken into and processed as macro-blocks. In H.264, macro-blocks are used, which each represent a block of 16 by 16 pixels. In the YUV color space model, each macro-block contains 4 8×8 luminance sub-blocks (or Y blocks), 1 U block, and 1 V block (represented 4:2:0, wherein the U and V blocks provide color information). Color can also be modeled or represented by the 4:2:2 or 4:4:4 YCbCr format (Cb and Cr are the blue and red Chrominance components).

Most video systems, such as H.261/3/4 and MPEG-1/2/4, exploit the spatial, temporal, and statistical redundancies in the source video. Some macro-blocks belong to more advanced macro-block types, such as skipped and non-skipped macro-blocks. In non-skipped macro-blocks, the encoder determines whether each of 8×8 luminance sub-blocks and 4×4 chrominance sub-block of a macro-block is to be encoded, giving the different number of encoded sub-blocks at each macro-block encoding times. It has been found that the correlation of bits between consecutive frames is high. Since the level of redundancy changes from frame to frame, the number of bits per frame is variable, even if the same quantization parameters are used for all frames.

Therefore, a buffer is typically employed to smooth out the variable video output rate and provide a constant video output rate. Rate control is used to prevent the buffer from overflowing (resulting in frame skipping) and/or under-flowing (resulting in low channel utilization) in order to achieve reasonable video quality. For real-time video communication such as video conferencing, proper rate control is more challenging as the rate control is employed to satisfy the low-delay constraints, especially in low bit rate channels.

Scalable Video Coding has been attracting attention due to its high flexibility. The current H.264/AVC scalable extension has adopted the Motion Compensated Temporal Filter (MCTF) framework to provide temporal scalability. However, faster motion estimation (ME) algorithms are desired because ME can introduce unnecessary delays based on the MCTF framework. In short, the reference software provided with the MCTF provides an inefficient solution for motion compensation.

Accordingly, it would be desirable to provide improved motion estimation for scalable video coding. The above-described deficiencies of current designs for video encoding are merely intended to provide an overview of some of the problems of today's designs, and are not intended to be exhaustive. Other problems with the state of the art and corresponding benefits of the invention may become further apparent upon review of the following description of various non-limiting embodiments of the invention.

SUMMARY

Embodiments of fast motion estimation (ME) algorithm based on the MCTF framework are provided, which can reduce encoding complexity significantly while maintaining the same or a similar bit rate and peak signal to noise ratio (PSNR).

A simplified and/or generalized summary is provided herein to help enable a basic or general understanding of various aspects of exemplary, non-limiting embodiments that follow in the more detailed description and the accompanying drawings. This summary is not intended, however, as an extensive or exhaustive overview. The sole purpose of this summary is to present some concepts related to the various exemplary non-limiting embodiments of the invention in a simplified form as a prelude to the more detailed description that follows.

BRIEF DESCRIPTION OF THE DRAWINGS

The motion compensation techniques for scalable video coding are further described with reference to the accompanying drawings in which:

FIG. 3 illustrates an exemplary estimation process by a motion vector predictor in accordance with non-limiting embodiments;

DETAILED DESCRIPTION

Overview

Figure 1:
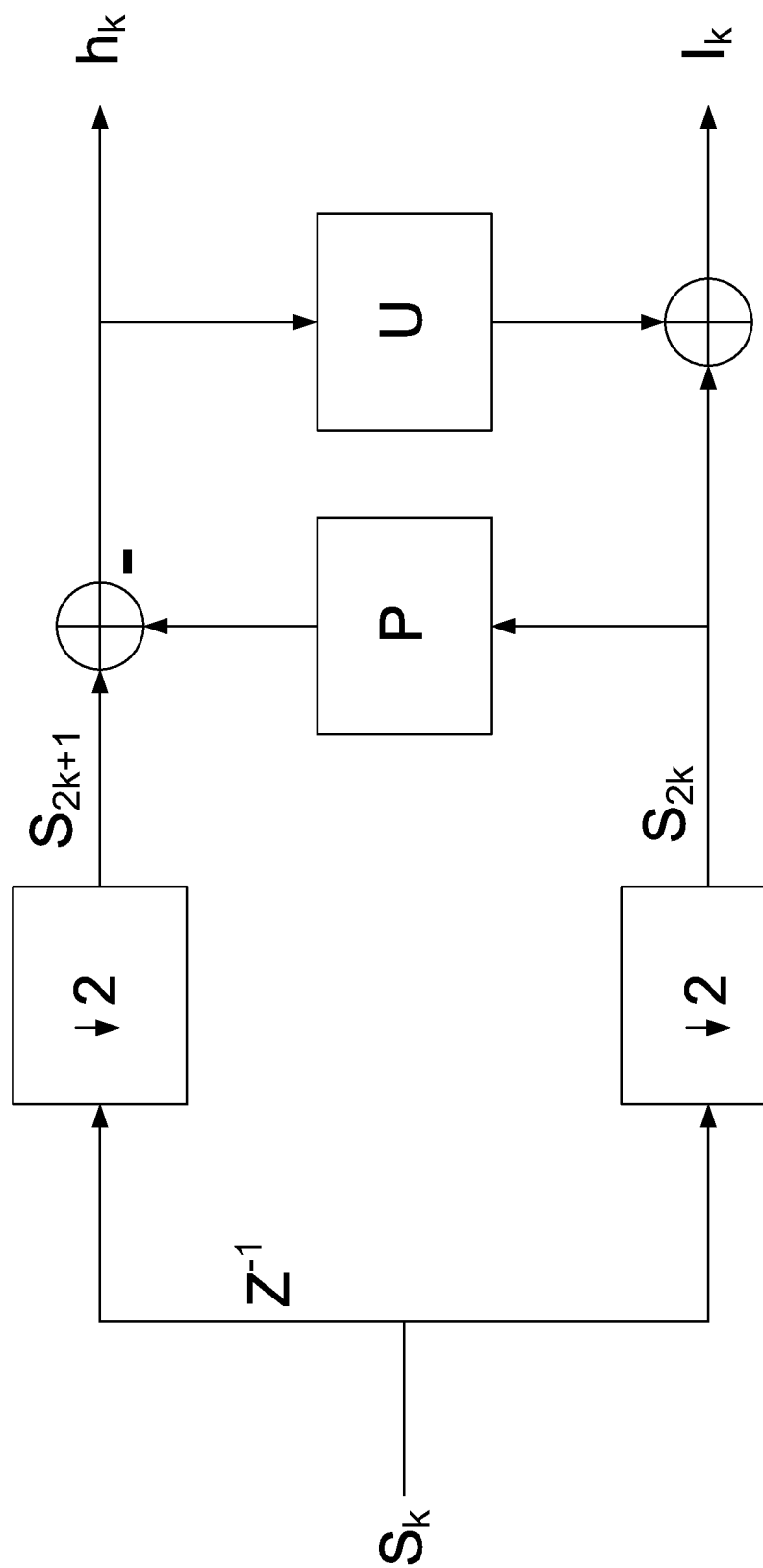
FIG. 1 shows a one-stage analysis filterbank in accordance with non-limiting embodiments.

As discussed in the background, conventionally known algorithms for performing motion estimation are not configurable for different circumstances under which devices might receive and display video, and thus improvement is desired for beyond the reference software for the H.264/AVE scalable extension, e.g., improvement for motion estimation algorithms.

By way of overview, the recent H.264/AVC scalable extension provides temporal, spatial and signal to noise ratio (SNR) scalability. Such flexibility is useful for serving multiple clients with different hardware configurations while on the encoder side, the video can be encoded only once. For example, embedded devices with lower computation power and limited screen size may prefer playback with lower frame-rate and lower resolution and therefore a partial bitstream can be decoded. However, it would be desirable to provide the ability to enhance resolution, frame-rate or quality upon request. In recent video coding standards, a Block Matching algorithm is applied to reduce the temporal redundancy to achieve higher coding efficiency.

In the MCTF framework, which is the alternative encoder prediction structure adopted in the H.264/AVC scalable extension (JSVM), Block Matching Motion Estimation (BMME) is still the core part for exploiting the temporal correlation across frames and temporal filtering. It is well known that motion estimation is the most complex, cost consuming part of the video encoder and therefore many motion estimation algorithms have been proposed for traditional non-scalable video coding standards. However, the situation with the MCTF framework is different from these traditional coding standards, which usually assume the correlation between two adjacent frames to be encoded is high, which is not always the case. Moreover, due to the lifting steps in the temporal domain, failure in motion compensated prediction can result in ghosting artifacts, which gives poor visual quality. Therefore, a reliable motion model that can capture the true motion is desired.

Accordingly, in various non-limiting embodiments, described herein are new motion estimation algorithms that take the advantages of the MCTF encoding structure. First, an MCTF coding scheme will be briefly reviewed for foundation, and then various embodiments for motion estimation algorithms are described herein, for which computer simulated results verify the improvements of the described motion estimation algorithms. Finally, some non-limiting, non-exhaustive conclusions are set forth based on insight gained.

Various embodiments and further underlying concepts of the video encoding techniques are described in more detail below.

Motion Compensated Temporal Filtering (MCTF)

MCTF provides the temporal scalability by performing a wavelet transform in the temporal domain; however, MCTF is not efficient when applying the transformation directly in the temporal direction if motion is significant within the frames to be encoded. Hence, with MCTF, the motion compensation technique is used in combination to achieve high compression efficiency and provide scalability. In this regard, MCTF is based on a lifting scheme. The lifting scheme insures perfect reconstruction of the input in the absence of quantization error.

FIG. 1 is a block diagram showing an exemplary one-stage analysis filterbank. The key operations of lifting refer to prediction (P) and update (U). The input of the analysis filterbank $S_k$ is split into odd and even samples, denoted by $S_{2k+1}$ and $S_{2k}$ respectively. The odd samples are predicted using a prediction operator $P(S_{2k})$ to obtain the high-pass signal $h_k$, which are the prediction residuals. The low-pass signal is then obtained by adding a linear combination of the high-pass signal $h_k$ to the even samples using the update operator $U(h_k)$, as represented by Equations (1) and (2) as follows:

$$h_k = S_{2k+1} - P(S_{2k}) \quad (1)$$

$$l_k = S_{2k} + U(h_k) \quad (2)$$

For the 5/3 wavelet transform, the prediction and update operators in MCTF are generalized with motion vectors are given by Equation (3):

$$P_{5/3}(S_{x,2k}) = \frac{1}{2} * (S_{x+mP0,2k-2rp0} + S_{x+mp1,2k+2+2rp1}) \quad (3)$$

$$U_{5/3}(h_{x,k}) = \frac{1}{4} * (h_{x+mU0,k+rU0} + h_{x+mU1,k-1-rU1}) \quad (4)$$

where m and r refer to the motion vectors and reference in-dices respectively. Basically, this is equivalent to bi-directional motion compensated prediction.

Figure 2:
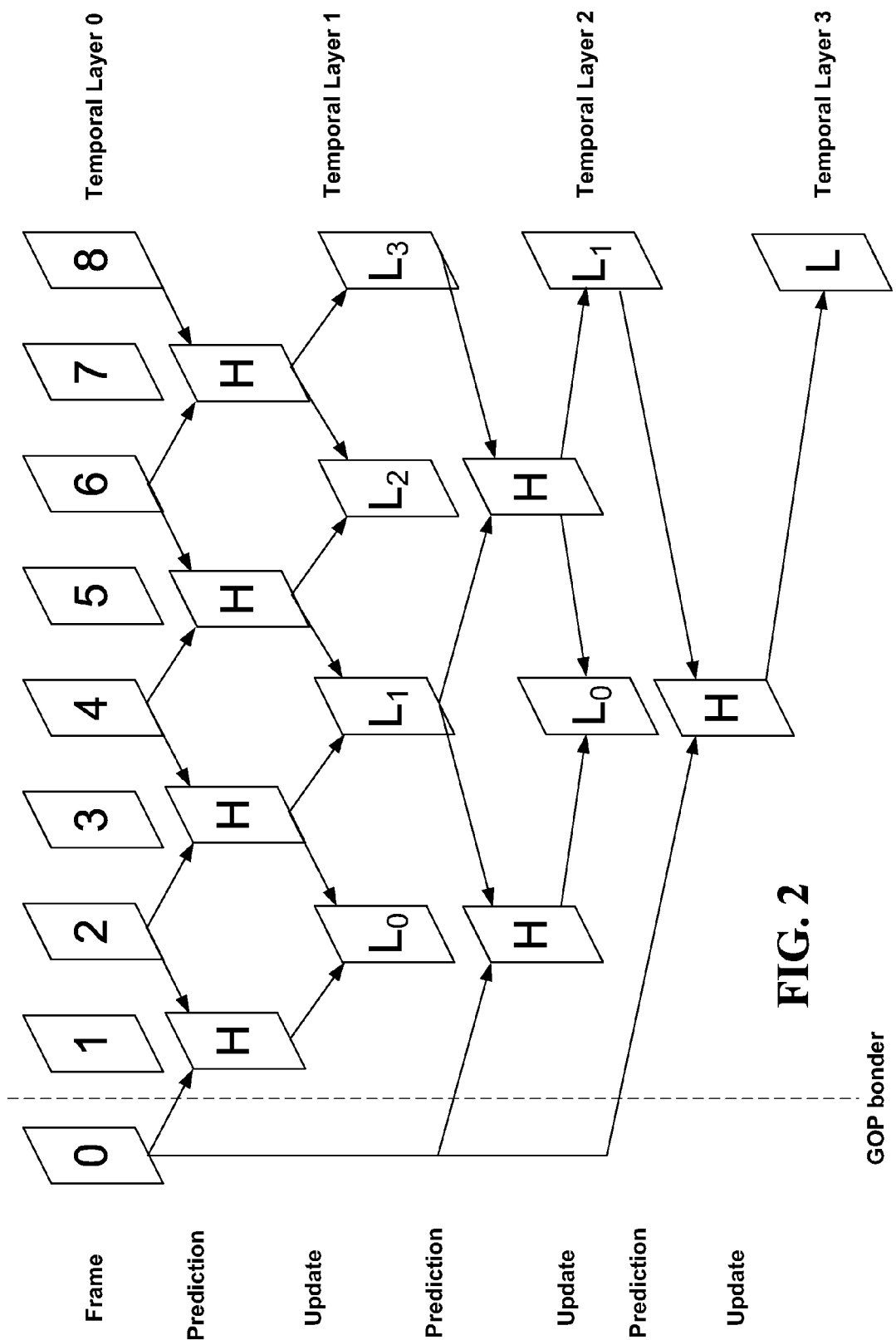
FIG. 2 shows an example for a median bias motion vector field of a MCTF decomposition process in accordance with non-limiting embodiments.

FIG. 2 shows an example for a median bias motion vector field of MCTF decomposition with a Group Of Picture (GOP) of 8 frames. In this example, the input sequences (the frames) are decomposed into 3 temporal layers, as indicated to the right of FIG. 1. The respective prediction and update steps are indicated on the left side. The decoding process can then be performed by inversing or inverting the encoding steps.

Fast Motion Estimation In MCTF Framework

As also shown in FIG. 2, the encoding process is the inverse of the decoding process. This is different from the traditional hybrid video coding with "IBBPBB." structure where I refers to an I-frame, B to a B-frame, and P to a P-frame as are known in the art. As mentioned, the frames are sent in groups of pictures (GOPs). Based on this new encoding structure, herein described are various embodiments of a new motion estimation algorithm having advantages not previously provided in the present context.

The performance of at least one conventionally known motion estimation technique called Predictive Motion Vector Field Adaptive Search Technique (PMVFAST) has been shown to be significantly better than many other fast algorithms, in terms of complexity, bitrate and PSNR, and as a consequence, was accepted into the MPEG4 standard. PMVFAST first examines a set of motion vector (MV) predictors, including the median, zero, left, top, top-right and previous MV predictors, with reference to a current block. Then, depending on the returned sum of absolute (luminance) differences (SAD) value, either small diamond refinement or large diamond refinement is performed using an adaptive threshold technique.

In another conventionally known motion estimation technique called E-PMVFAST, a future MV predictor is introduced. This future MV predictor estimates the right MV predictor using the median of the top, top-right and top-right-right MV predictors, as shown in FIG. 3.

Since the block scanning order in the encoding process is from top to down and left to right, this right MV predictor is not available yet and therefore needs to be estimated. Comparing with the Full Search (FS) and many other fast motion estimation algorithms, these two algorithms generate smoother motion vector fields and are able to capture the true motion more accurately.

The methods and apparatus herein described first modify the previous MV predictor due to the MCTF decomposition structure. Referring back to FIG. 2, in temporal layer 1, the low-passed frame $L_0$ is predicted from frames 0 and 4. Since the decomposition process follows from lower temporal layer (layer 0) to higher layer (layer 3), the motion information from the lower layer is reused, as shown in FIG. 4.

Figure 4:
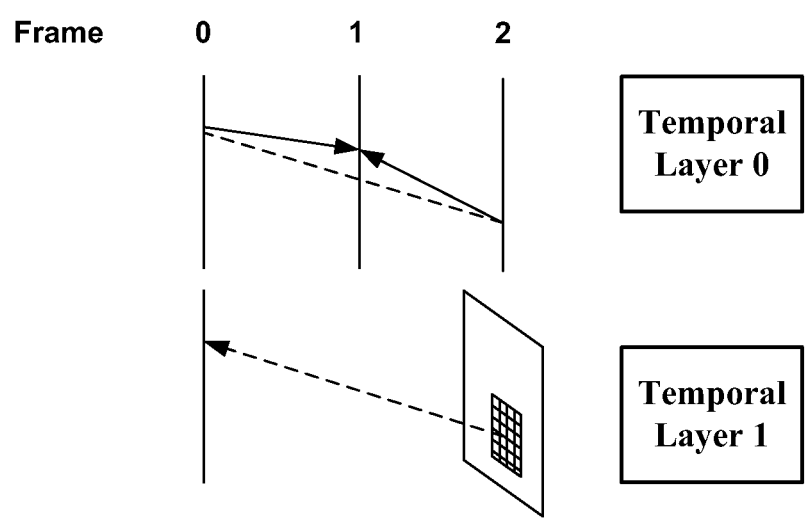
FIG. 4 illustrates exemplary reuse of the motion information from a lower processing layer in accordance with non-limiting embodiments.

In FIG. 4, the MV predictor depicted with a broken line is named herein as "temporal MV" predictor since it represents the estimated MV for forward prediction. The temporal MV predictor is obtained by summing up the backward prediction and reversed forward prediction MVs of frame 1. Inside the shaded area, the predicted MV is added as a candidate predictor since the predictor may fall into the boundary of blocks. The area of shaded region depends on the temporal distance between two frames. Such approach may result in more than one predictor within a block and hence up to three candidate predictors are allowed for each block. The reuse of motion information not only simplifies the motion estimation process, but also helps for capturing the true motion since typically the correlation within two frames decreases as the temporal layer increases, and therefore the situation of the MVs falling into a local minimum is avoided. Within the same temporal layer, the reversed motion vectors from the previous frame are used according to a similar approach.

The herein described motion estimation algorithm is thus generalized as follows with reference to FIG. 5 and method 500. At 505, the median predictor is checked, that is, the median MV of the Left, Top and TopRight (TopLeft if TopRight not available) blocks. At 510, early termination occurs if the returned rate distortion cost is less than a threshold, in which case one can use PMVFAST or another technique for checking the median bias motion vector field.

At 515, the Zero, Left, Top, TopRight, Future and Temporal MV are checked. Again, if cost is less than a threshold, then the process terminates at 520. At 525, the position with the lowest SAD is selected as the center of refinement. At 530, the level of refinement is determined.

Figure 5:
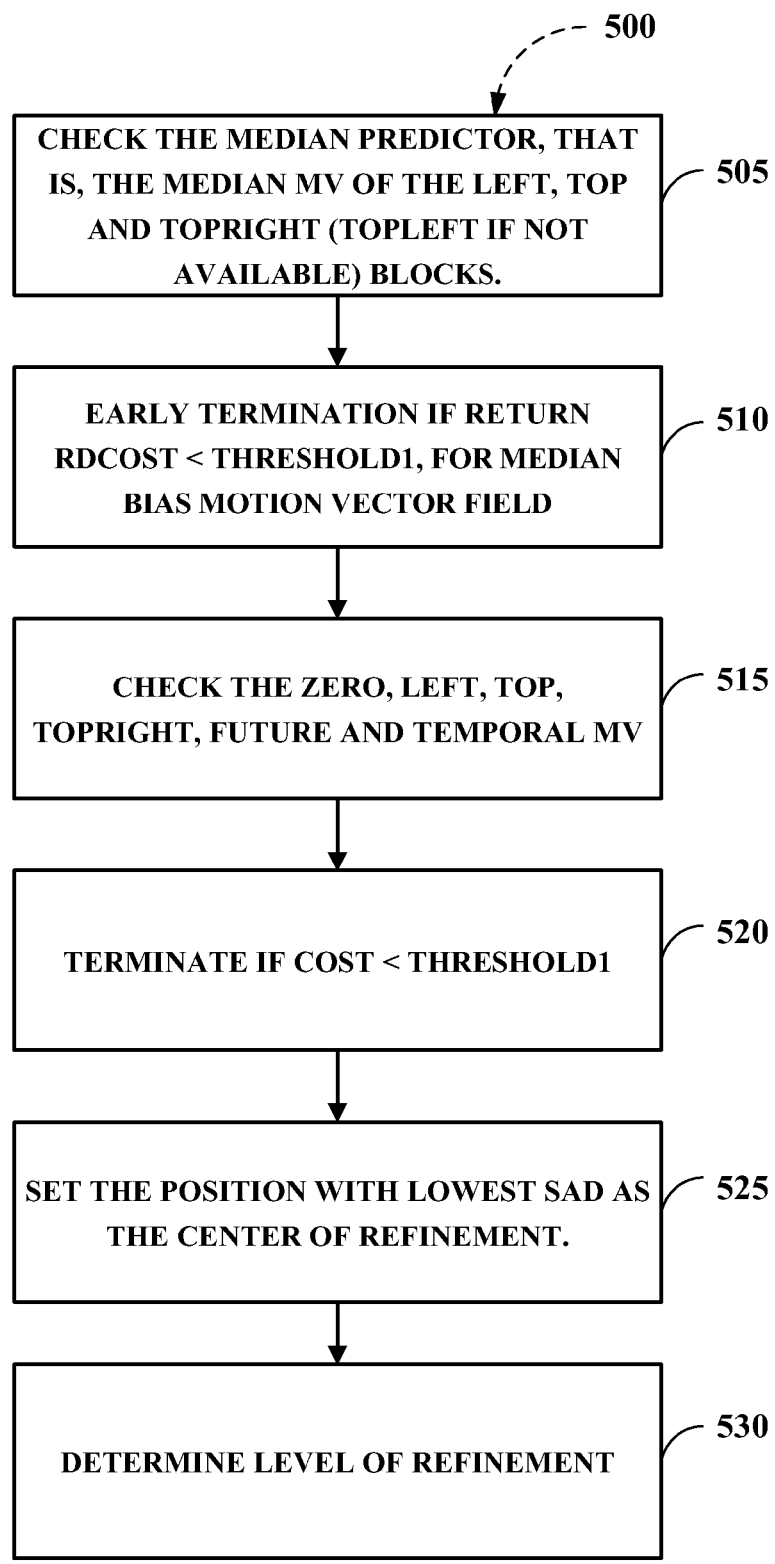
FIG. 5 is a flow diagram of an exemplary non-limiting process for performing motion estimation in accordance with non-limiting embodiments.
Figure 6:
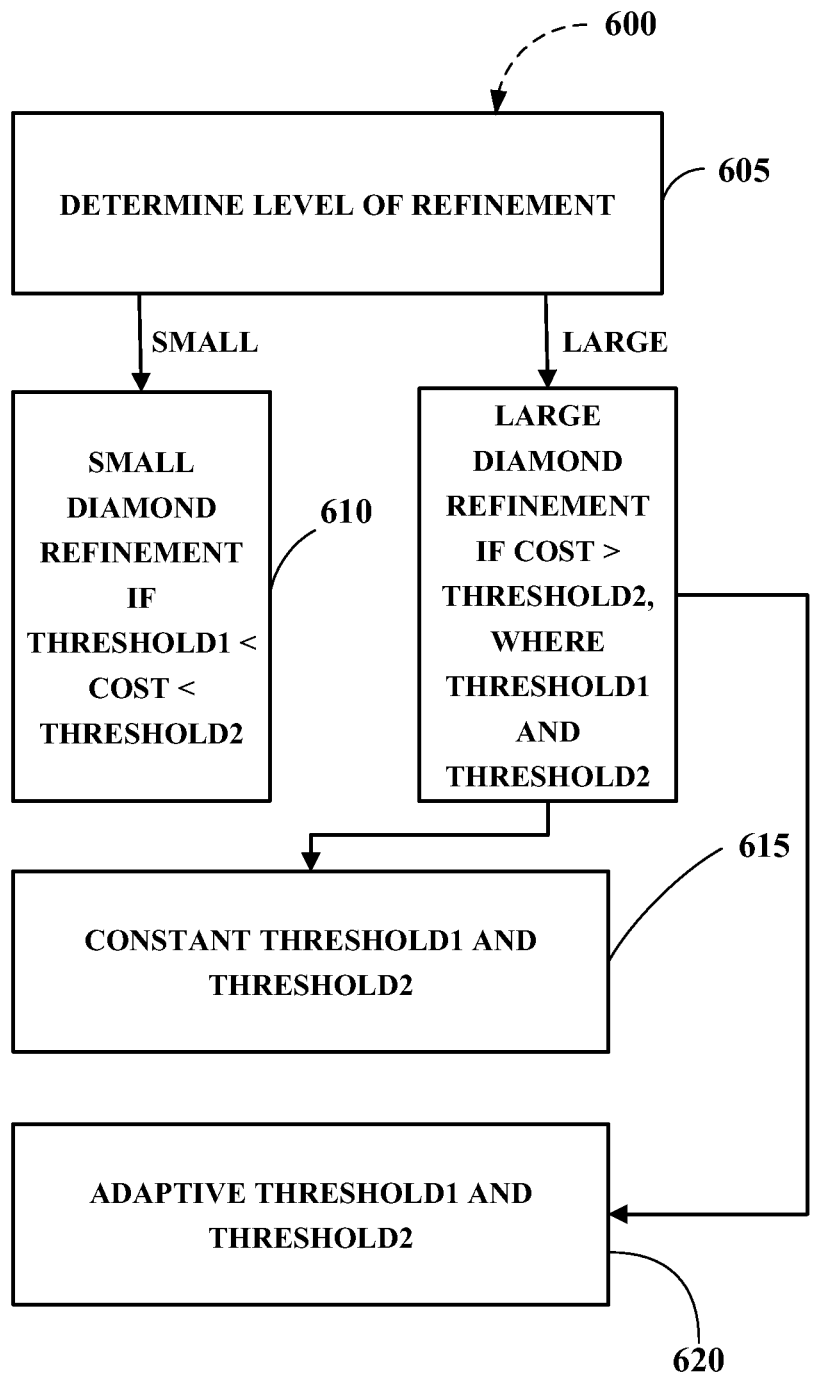
FIG. 6 illustrates exemplary determination of a level of refinement in accordance with non-limiting embodiments.

The determination of the level of refinement at 530 of FIG. 5 can be further understood with reference to step 605 of method 600 of FIG. 6. In one embodiment, small diamond refinement is performed at 610 if a first threshold is less than a cost which is also less than a second threshold, i.e., if the cost is in a range between two thresholds. If the cost is larger than the range of thresholds, i.e., larger than the second threshold at 615, then Threshold1 and Threshold2 can be the adaptive threshold values presented at 620 per PMVFAST, or alternatively, Threshold1 and Threshold2 can be held constant at 615.

If motion estimation fails, the energy of the high-pass residual frame is significant, resulting in ghosting artifacts during the update step in MCTF that give poor visual quality. To reduce such annoying artifact, conventional schemes have proposed to use more accurate motion models, and to use the chroma information. Also, in the current JSVM software, a conventional technique employs a simplified Energy Distributed Update (EDU) for limiting the update strength.

In addition, the update step can be skipped for blocks with significant MV change as detected. This excludes the motion vectors that are too different from their neighboring MVs from the update operation since such MVs are identified as not reliable, a situation that may not improve, and that can even harm, the coding performance.

Accordingly, in consideration of the problem, it is assumed that the differential motion vector of the current coding block is $(\Delta dx, \Delta dy)$, in which case the following condition of Equation (5) can be used to exclude outlier MVs:

$$|\Delta x|+|\Delta y|<T_{mv} \qquad (5)$$

In one embodiment, the threshold value $T_{mv}$ can be set to 5 in the current version of JSVM. However, the motion field is usually reliable due to the median biased early termination step. Thus, if the differential MV is large, it is quite possible that other new objects' motion are captured. Therefore this step is removed in one implementation.

Performance Demonstration

The herein described algorithms were implemented in the JSVM 2.0 model and compared with the fast algorithm included in the reference software with different testing sequences and different qualities. The same encoder configuration was used in all comparisons and with default settings except as specified otherwise. The search count is calculated for each 4 by 4 block, i.e. search count is added by 4 for each 8×8 block search.

Table 1 below shows the average search count and the testing conditions for other testing sequences. The search count is calculated for each 4 by 4 block, i.e. search count is added by 4 for each 8×8 block search. From the table the proposed algorithm gives similar or only slightly degraded quality comparing to the existing fast algorithm. However the proposed algorithm significantly outperform the existing one in terms of complexity, with more than 50% search point reduced in sequences that contain complex motion. For sequences such as news and container, speed up in terms of search count can be up to 5 times. Search count for full search is given for reference.

TABLE 1

| | Test Sequence | ISVM-FME | Proposed | Speed-Up % | Full Search |
|---|---|---|---|---|---|
| QCIF | Foreman | 845161817 | 350658902 | 241.021064 | 16503135317 |
| | Table | 779056279 | 258443024 | 301.442177 | |
| | News | 714261639 | 146435250 | 487.766189 | |
| | Container | 690137922 | 157188876 | 439.050103 | |
| | Mother & Daughter | 711594328 | 195787132 | 363.453063 | |

TABLE 1-continued

| | Test Sequence | ISVM-FME | Proposed | Speed-Up % | Full Search |
|---|---|---|---|---|---|
| CIF | Silent | 754822453 | 195337506 | 386.419622 | |
| | Hall | 696334721 | 195417334 | 356.332116 | |
| | Foreman | 3575308597 | 1543348956 | 231.659119 | 66012541268 |
| | News | 2925050967 | 646400858 | 452.513472 | |
| | SearchFuncFullPel | SAD | | Intra Period | −1 |
| | SearchFuncSubPel | Hadamard | | GOP Size | 8 |
| | Weight Prediction | Off | | Adap GOP | Off |

Figure 7:
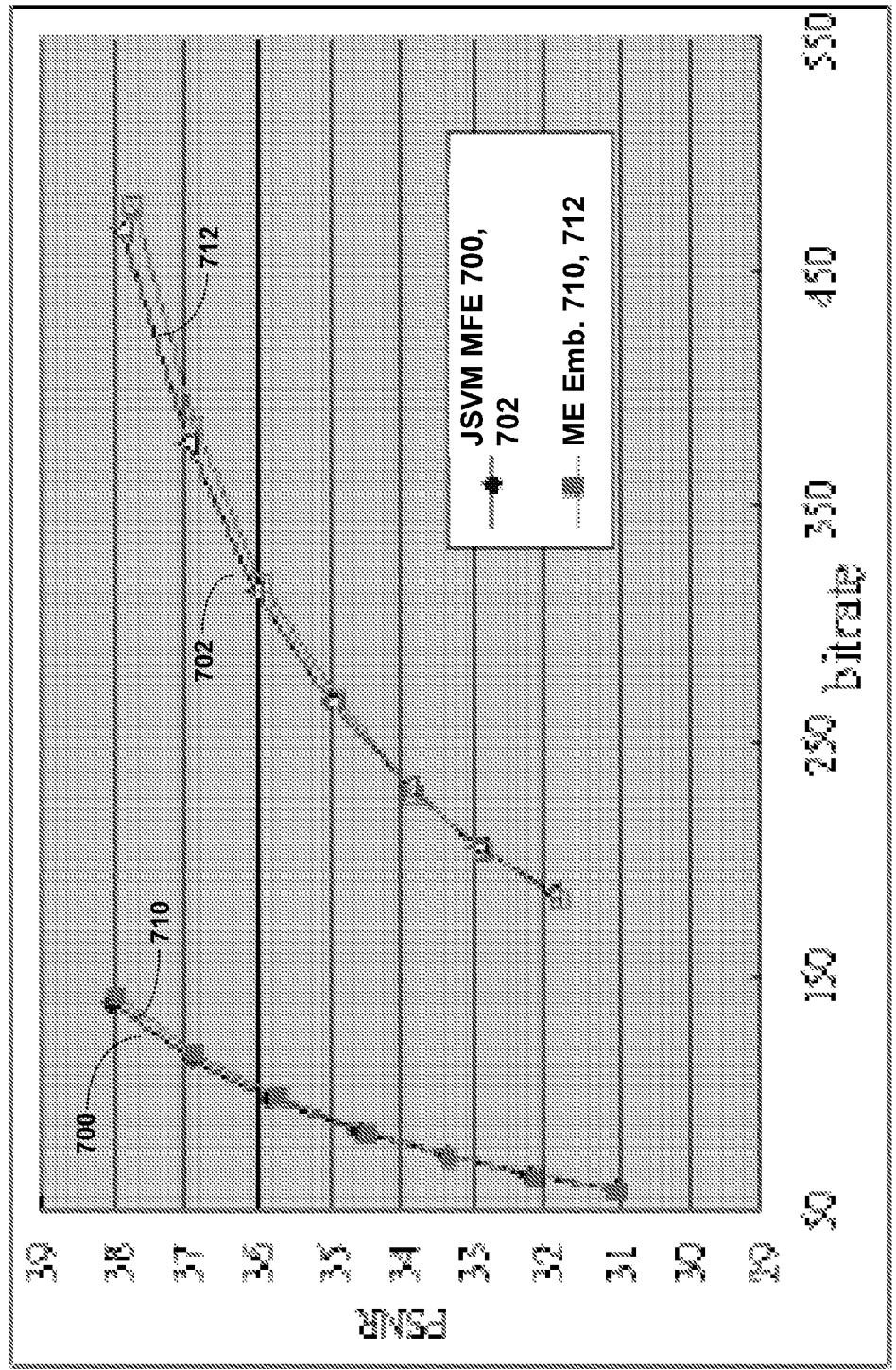
FIGS. 7, 8, 9 and 10 show the result of a comparison of a conventional algorithm and an algorithms described herein with respect to four different sample image sequences.
Figure 8:
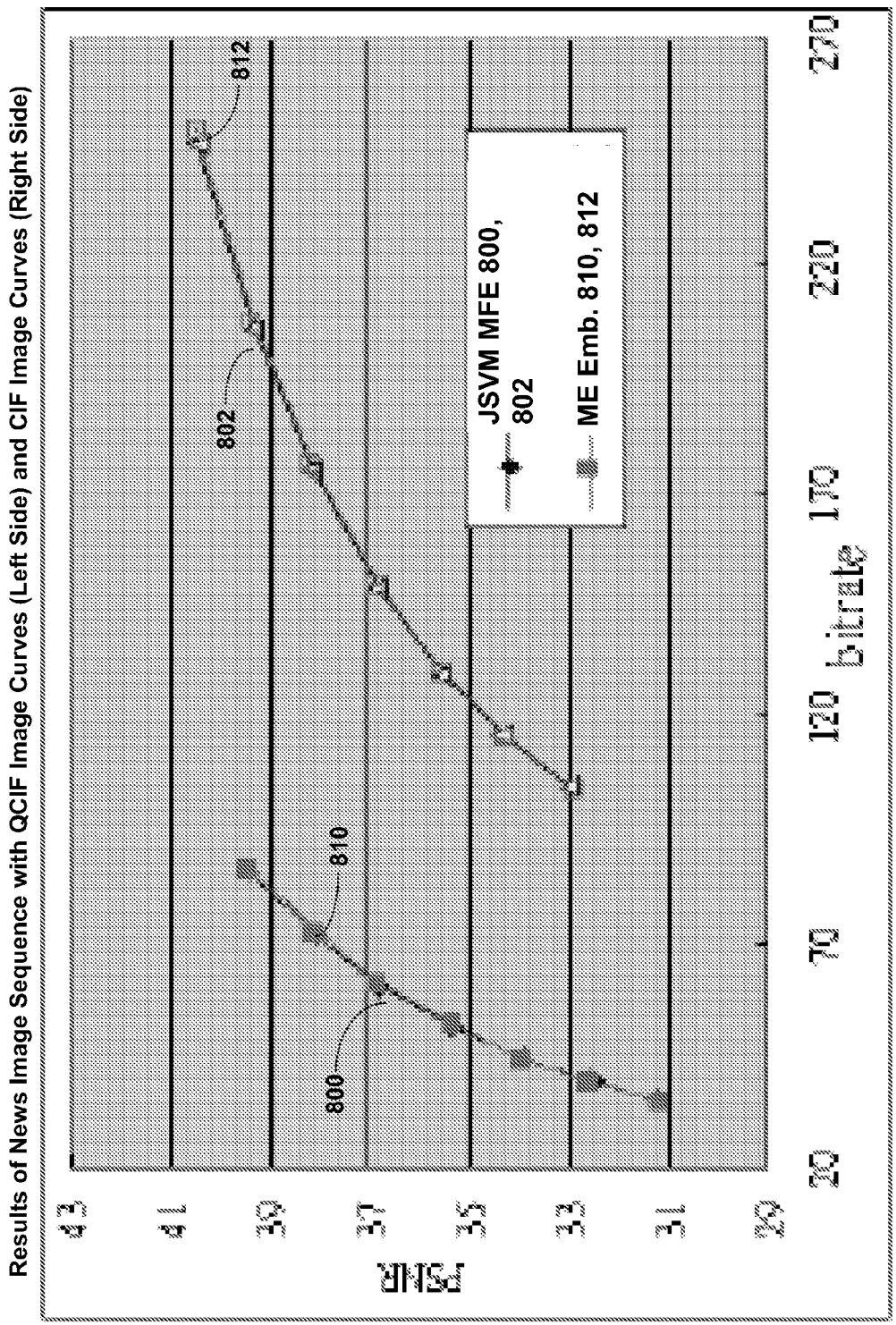

FIGS. 7, 8, 9 and 10 show the result of a comparison of the two algorithms with the publicly available foreman, news, table and container sample image sequences, respectively. In FIG. 7, curves 700 and 702 represent the performance in terms of PSNR v. bit rate for image sequences encoded with the JSVM MFE techniques, and curves 710, 712 represent the performance in terms of PSNR v. bit rate for image sequences encoded according to the techniques described herein, for QCIF and CIF image formats, respectively. Similarly, in FIG. 8, curves 800 and 802 represent the performance for image sequences encoded with the JSVM MFE techniques, and curves 810, 812 represent the performance for image sequences encoded according to the techniques described herein, for QCIF and CIF image formats, respectively.

Figure 9:
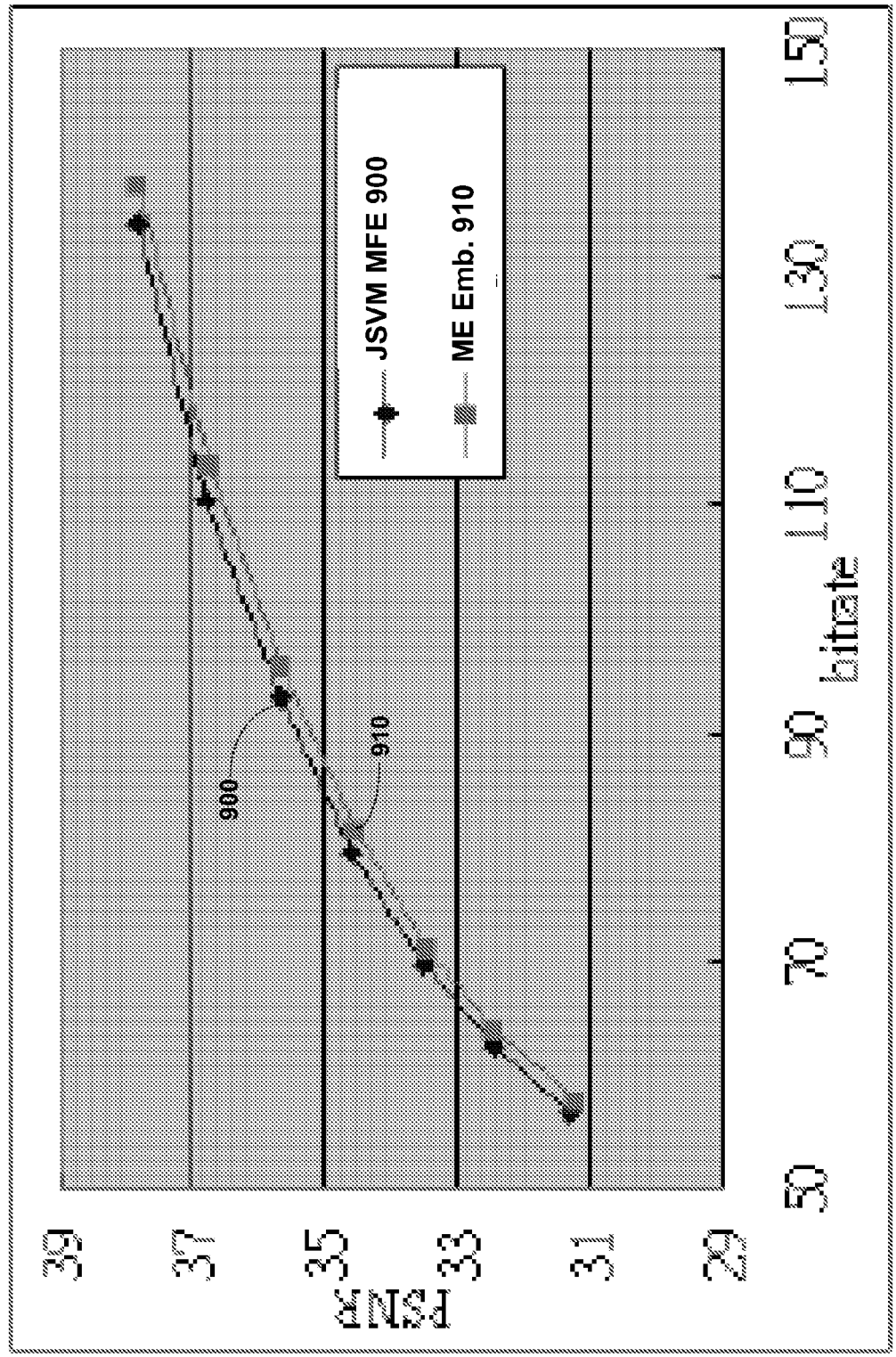
Figure 10:
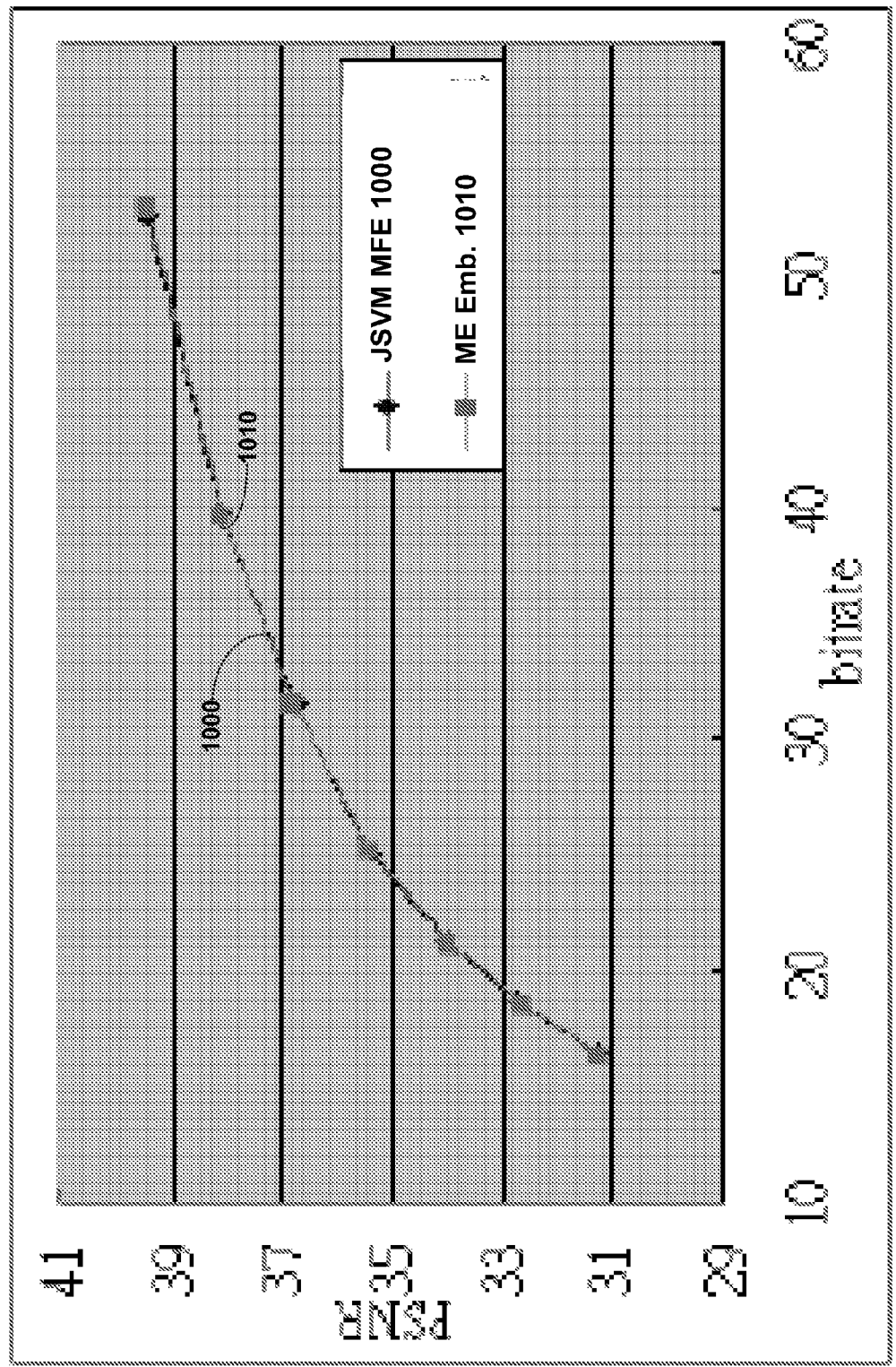

FIG. 9 similarly includes curve 900 representing the performance for image sequences encoded with the JSVM MFE techniques, and curve 910 representing the performance for image sequences encoded according to the techniques described herein for the QCIF image format. And FIG. 10 includes curve 1000 representing the performance for image sequences encoded with the JSVM MFE techniques, and curve 1010 representing the performance for image sequences encoded according to the techniques described herein for the QCIF image format.

In this regard, it is noted that the herein described algorithms give similar or only slightly degraded quality comparing to the existing fast algorithm. However, the herein described algorithms significantly outperform the existing ones in terms of complexity, with more than 50% search points reduced in sequences that contain complex motion. As reflected by Table A, for sequences such as news and container, speed up, in terms of search count, by applying the herein described algorithms can be up to 5 times. In some cases, search count for full search is given for reference.

The performance of the herein described algorithm in low bit-rate can be lower than for high bit-rate applications, which can be explained by the coding method of motion vectors. In H.264/AVC, the differential motion vectors are coded instead of directly applying UVLC (Universal Variable Length Coder). This benefits the median biased motion vector field generated by PMVFAST. Since in low bit-rate the cost of coding MVs is relatively high, zero biased differential motion vectors results in lower MV cost. However, in the current JSVM reference software, MVs (not differential MVs) are coded and therefore such benefit is not shown.

Conclusion

In this paper herein described are fast motion estimation algorithms for the MCTF framework in scalable video coding. Simulation results have shown that the herein described algorithms can maintain similar quality comparing with the existing motion estimation algorithm implemented in the reference software, with significantly improved performance in complexity, e.g., up to 5 times with respect to computational complexity associated with search.

Exemplary Networked and Distributed Environments

One of ordinary skill in the art can appreciate that the innovation can be implemented in connection with any computer or other client or server device, which can be deployed as part of a computer network, or in a distributed computing environment, connected to any kind of data store. In this regard, the present innovation pertains to any computer system or environment having any number of memory or storage units, and any number of applications and processes occurring across any number of storage units or volumes, which may be used in connection with optimization algorithms and processes performed in accordance with the present innovation. The present innovation may apply to an environment with server computers and client computers deployed in a network environment or a distributed computing environment, having remote or local storage. The present innovation may also be applied to standalone computing devices, having programming language functionality, interpretation and execution capabilities for generating, receiving and transmitting information in connection with remote or local services and processes.

Distributed computing provides sharing of computer resources and services by exchange between computing devices and systems. These resources and services include the exchange of information, cache storage, and disk storage for objects, such as files. Distributed computing takes advantage of network connectivity, allowing clients to leverage their collective power to benefit the entire enterprise. In this regard, a variety of devices may have applications, objects, or resources that may implicate the optimization algorithms and processes of the innovation.

Figure 11:
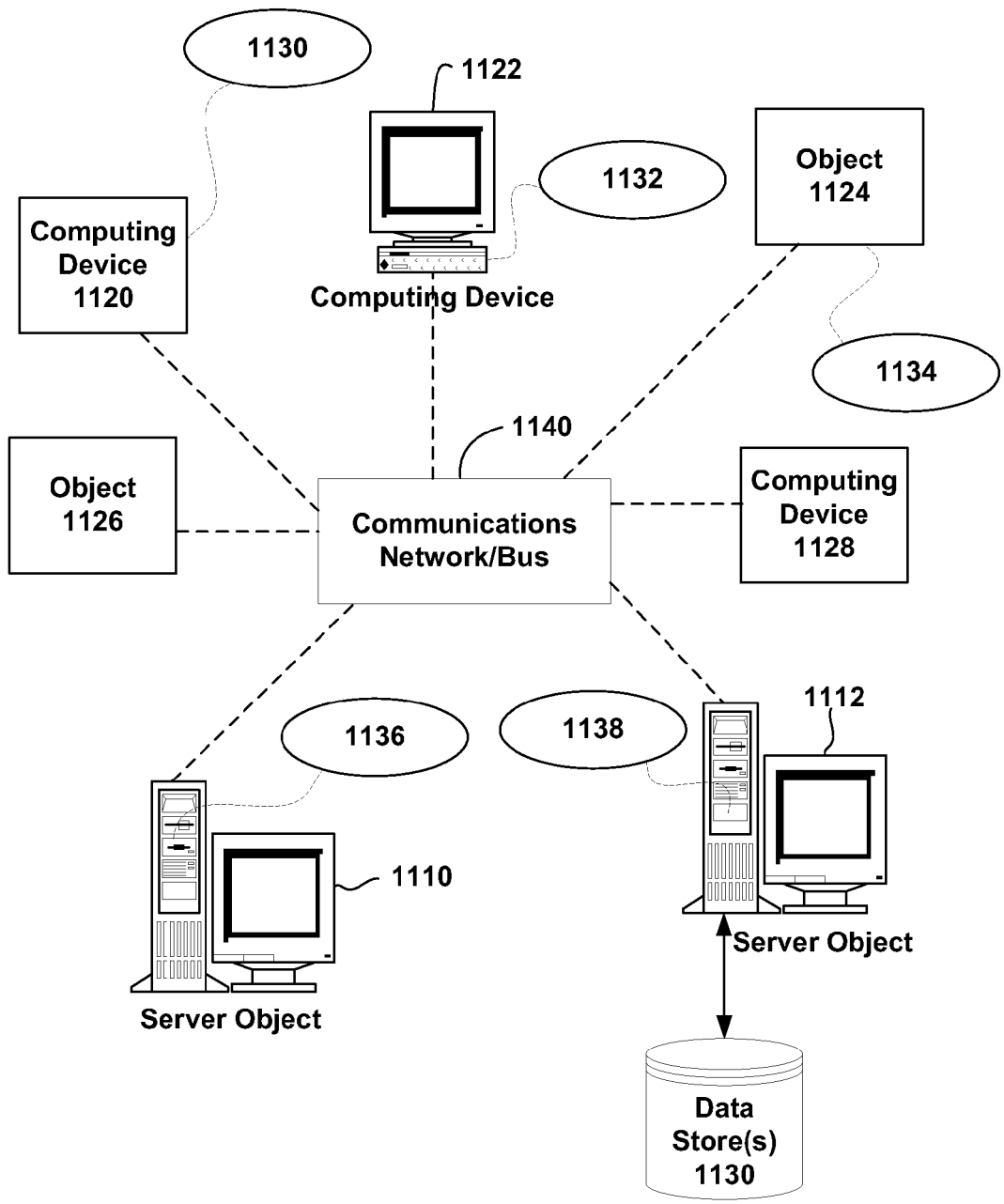
FIG. 11 is a block diagram representing an exemplary non-limiting computing system or operating environment in which the present invention may be implemented.

FIG. 11 provides a schematic diagram of an exemplary networked or distributed computing environment. The distributed computing environment comprises computing objects 1110a, 1110b, etc. and computing objects or devices 1120a, 1120b, 1120c, 1120d, 1120e, etc. These objects may comprise programs, methods, data stores, programmable logic, etc. The objects may comprise portions of the same or different devices such as PDAs, audio/video devices, MP3 players, personal computers, etc. Each object can communicate with another object by way of the communications network 1140. This network may itself comprise other computing objects and computing devices that provide services to the system of FIG. 11, and may itself represent multiple interconnected networks. In accordance with an aspect of the innovation, each object 1110a, 1110b, etc. or 1120a, 1120b, 1120c, 1120d, 1120e, etc. may contain an application that might make use of an API, or other object, software, firmware and/or hardware, suitable for use with the design framework in accordance with the innovation.

It can also be appreciated that an object, such as 1120*c*, may be hosted on another computing device 1110*a*, 1110*b*, etc. or 1120*a*, 1120*b*, 1120*c*, 1120*d*, 1120*e*, etc. Thus, although the physical environment depicted may show the connected devices as computers, such illustration is merely exemplary and the physical environment may alternatively be depicted or described comprising various digital devices such as PDAs, televisions, MP3 players, etc., any of which may employ a variety of wired and wireless services, software objects such as interfaces, COM objects, and the like.

There are a variety of systems, components, and network configurations that support distributed computing environments. For example, computing systems may be connected together by wired or wireless systems, by local networks or widely distributed networks. Currently, many of the networks are coupled to the Internet, which provides an infrastructure for widely distributed computing and encompasses many different networks. Any of the infrastructures may be used for exemplary communications made incident to optimization algorithms and processes according to the present innovation.

In home networking environments, there are at least four disparate network transport media that may each support a unique protocol, such as Power line, data (both wireless and wired), voice (e.g., telephone) and entertainment media. Most home control devices such as light switches and appliances may use power lines for connectivity. Data Services may enter the home as broadband (e.g., either DSL or Cable modem) and are accessible within the home using either wireless (e.g., HomeRF or 802.11A/B/G) or wired (e.g., Home PNA, Cat 5, Ethernet, even power line) connectivity. Voice traffic may enter the home either as wired (e.g., Cat 3) or wireless (e.g., cell phones) and may be distributed within the home using Cat 3 wiring. Entertainment media, or other graphical data, may enter the home either through satellite or cable and is typically distributed in the home using coaxial cable. IEEE 1394 and DVI are also digital interconnects for clusters of media devices. All of these network environments and others that may emerge, or already have emerged, as protocol standards may be interconnected to form a network, such as an intranet, that may be connected to the outside world by way of a wide area network, such as the Internet. In short, a variety of disparate sources exist for the storage and transmission of data, and consequently, any of the computing devices of the present innovation may share and communicate data in any existing manner, and no one way described in the embodiments herein is intended to be limiting.

The Internet commonly refers to the collection of networks and gateways that utilize the Transmission Control Protocol/Internet Protocol (TCP/IP) suite of protocols, which are well known in the art of computer networking. The Internet can be described as a system of geographically distributed remote computer networks interconnected by computers executing networking protocols that allow users to interact and share information over network(s). Because of such wide-spread information sharing, remote networks such as the Internet have thus far generally evolved into an open system with which developers can design software applications for performing specialized operations or services, essentially without restriction.

Thus, the network infrastructure enables a host of network topologies such as client/server, peer-to-peer, or hybrid architectures. The "client" is a member of a class or group that uses the services of another class or group to which it is not related. Thus, in computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer, e.g., a server. In the illustration of FIG. 11, as an example, computers 1120*a*, 1120*b*, 1120*c*, 1120*d*, 1120*e*, etc. can be thought of as clients and computers 1110*a*, 1110*b*, etc. can be thought of as servers where servers 1110*a*, 1110*b*, etc. maintain the data that is then replicated to client computers 1120*a*, 1120*b*, 1120*c*, 1120*d*, 1120*e*, etc., although any computer can be considered a client, a server, or both, depending on the circumstances. Any of these computing devices may be processing data or requesting services or tasks that may implicate the optimization algorithms and processes in accordance with the innovation.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the optimization algorithms and processes of the innovation may be distributed across multiple computing devices or objects.

Client(s) and server(s) communicate with one another utilizing the functionality provided by protocol layer(s). For example, HyperText Transfer Protocol (HTTP) is a common protocol that is used in conjunction with the World Wide Web (WWW), or "the Web." Typically, a computer network address such as an Internet Protocol (IP) address or other reference such as a Universal Resource Locator (URL) can be used to identify the server or client computers to each other. The network address can be referred to as a URL address. Communication can be provided over a communications medium, e.g., client(s) and server(s) may be coupled to one another via TCP/IP connection(s) for high-capacity communication.

Thus, FIG. 11 illustrates an exemplary networked or distributed environment, with server(s) in communication with client computer (s) via a network/bus, in which the present innovation may be employed. In more detail, a number of servers 1110*a*, 1110*b*, etc. are interconnected via a communications network/bus 1140, which may be a LAN, WAN, intranet, GSM network, the Internet, etc., with a number of client or remote computing devices 1120*a*, 1120*b*, 1120*c*, 1120*d*, 1120*e*, etc., such as a portable computer, handheld computer, thin client, networked appliance, or other device, such as a VCR, TV, oven, light, heater and the like in accordance with the present innovation. It is thus contemplated that the present innovation may apply to any computing device in connection with which it is desirable to communicate data over a network.

In a network environment in which the communications network/bus 1140 is the Internet, for example, the servers 1110*a*, 1110*b*, etc. can be Web servers with which the clients 1120*a*, 1120*b*, 1120*c*, 1120*d*, 1120*e*, etc. communicate via any of a number of known protocols such as HTTP. Servers 1110*a*, 1110*b*, etc. may also serve as clients 1120*a*, 1120*b*, 1120*c*, 1120*d*, 1120*e*, etc., as may be characteristic of a distributed computing environment.

As mentioned, communications may be wired or wireless, or a combination, where appropriate. Client devices 1120*a*, 1120*b*, 1120*c*, 1120*d*, 1120*e*, etc. may or may not communicate via communications network/bus 1140, and may have independent communications associated therewith. For example, in the case of a TV or VCR, there may or may not be a networked aspect to the control thereof. Each client computer 1120*a*, 1120*b*, 1120*c*, 1120*d*, 1120*e*, etc. and server computer 1110*a*, 1110*b*, etc. may be equipped with various application program modules or objects 1135*a*, 1135*b*, 1135*c*, etc. and with connections or access to various types of storage elements or objects, across which files or data streams may be stored or to which portion(s) of files or data streams may be downloaded, transmitted or migrated. Any one or more of computers 1110*a*, 1110*b*, 1120*a*, 1120*b*, 1120*c*, 1120*d*, 1120*e*, etc. may be responsible for the maintenance and updating of a database 1130 or other storage element, such as a database or memory 1130 for storing data processed or saved according to the innovation. Thus, the present innovation can be utilized in a computer network environment having client computers 1120*a*, 1120*b*, 1120*c*, 1120*d*, 1120*e*, etc. that can access and interact with a computer network/bus 1140 and server computers 1110*a*, 1110*b*, etc. that may interact with client computers 1120*a*, 1120*b*, 1120*c*, 1120*d*, 1120*e*, etc. and other like devices, and databases 1130.

Exemplary Computing Device

Figure 12:
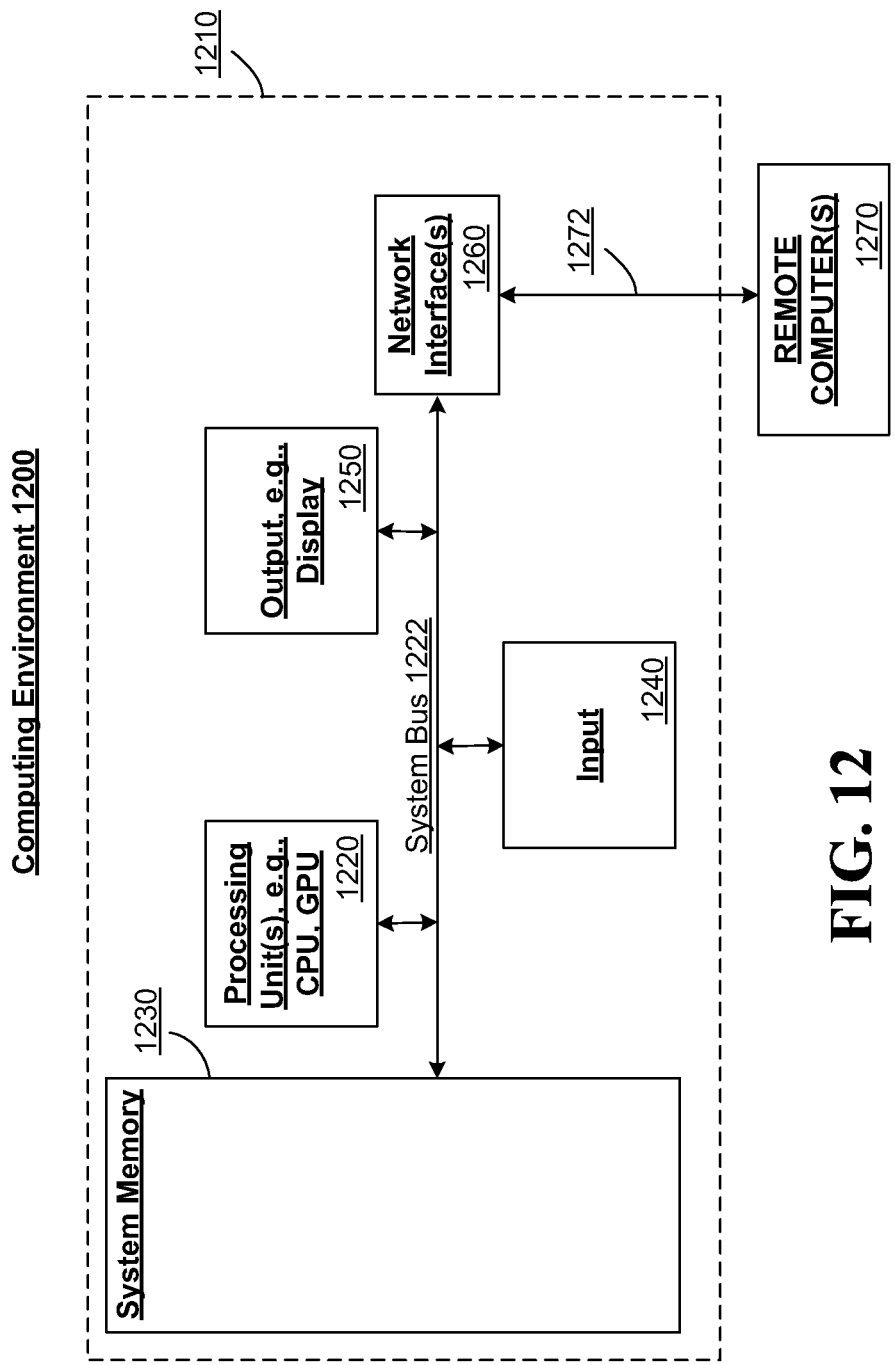
FIG. 12 illustrates an overview of a network environment suitable for service by embodiments of the invention.

As mentioned, the innovation applies to any device wherein it may be desirable to communicate data, e.g., to a mobile device. It should be understood, therefore, that handheld, portable and other computing devices and computing objects of all kinds are contemplated for use in connection with the present innovation, i.e., anywhere that a device may communicate data or otherwise receive, process or store data. Accordingly, the below general purpose remote computer described below in FIG. 12 is but one example, and the present innovation may be implemented with any client having network/bus interoperability and interaction. Thus, the present innovation may be implemented in an environment of networked hosted services in which very little or minimal client resources are implicated, e.g., a networked environment in which the client device serves merely as an interface to the network/bus, such as an object placed in an appliance.

Although not required, the innovation can partly be implemented via an operating system, for use by a developer of services for a device or object, and/or included within application software that operates in connection with the component(s) of the innovation. Software may be described in the general context of computer executable instructions, such as program modules, being executed by one or more computers, such as client workstations, servers, or other devices. Those skilled in the art will appreciate that the innovation may be practiced with other computer system configurations and protocols.

FIG. 12 thus illustrates an example of a suitable computing system environment 1200*a* in which the innovation may be implemented, although as made clear above, the computing system environment 1200*a* is only one example of a suitable computing environment for a media device and is not intended to suggest any limitation as to the scope of use or functionality of the innovation. Neither should the computing environment 1200*a* be interpreted as having any dependency or requirement relating to any one or combination of components illustrated in the exemplary operating environment 1200*a*.

With reference to FIG. 12, an exemplary remote device for implementing the innovation includes a general purpose computing device in the form of a computer 1210*a*. Components of computer 1210*a* may include, but are not limited to, a processing unit 1220*a*, a system memory 1230*a*, and a system bus 1221*a* that couples various system components including the system memory to the processing unit 1220*a*.

The system bus 1221*a* may be any of several types of bus structures including a memory bus or memory controller, a peripheral bus, and a local bus using any of a variety of bus architectures.

Computer 1210*a* typically includes a variety of computer readable media. Computer readable media can be any available media that can be accessed by computer 1210*a*. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules, or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 1210*a*. Communication media typically embodies computer readable instructions, data structures, program modules, or other data in a modulated data signal such as a carrier wave or other transport mechanism and includes any information delivery media.

The system memory 1230*a* may include computer storage media in the form of volatile and/or nonvolatile memory such as read only memory (ROM) and/or random access memory (RAM). A basic input/output system (BIOS), containing the basic routines that help to transfer information between elements within computer 1210*a*, such as during start-up, may be stored in memory 1230*a*. Memory 1230*a* typically also contains data and/or program modules that are immediately accessible to and/or presently being operated on by processing unit 1220*a*. By way of example, and not limitation, memory 1230*a* may also include an operating system, application programs, other program modules, and program data.

The computer 1210*a* may also include other removable/non-removable, volatile/nonvolatile computer storage media. For example, computer 1210*a* could include a hard disk drive that reads from or writes to non-removable, nonvolatile magnetic media, a magnetic disk drive that reads from or writes to a removable, nonvolatile magnetic disk, and/or an optical disk drive that reads from or writes to a removable, nonvolatile optical disk, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM and the like. A hard disk drive is typically connected to the system bus 1221*a* through a non-removable memory interface such as an interface, and a magnetic disk drive or optical disk drive is typically connected to the system bus 1221*a* by a removable memory interface, such as an interface.

A user may enter commands and information into the computer 1210*a* through input devices such as a keyboard and pointing device, commonly referred to as a mouse, trackball or touch pad. Other input devices may include a microphone, joystick, game pad, satellite dish, scanner, or the like. These and other input devices are often connected to the processing unit 1220*a* through user input 1240*a* and associated interface(s) that are coupled to the system bus 1221*a*, but may be connected by other interface and bus structures, such as a parallel port, game port or a universal serial bus (USB). A graphics subsystem may also be connected to the system bus 1221*a*. A monitor or other type of display device is also connected to the system bus 1221a via an interface, such as output interface 1250a, which may in turn communicate with video memory. In addition to a monitor, computers may also include other peripheral output devices such as speakers and a printer, which may be connected through output interface 1250a.

The computer 1210a may operate in a networked or distributed environment using logical connections to one or more other remote computers, such as remote computer 1270a, which may in turn have media capabilities different from device 1210a. The remote computer 1270a may be a personal computer, a server, a router, a network PC, a peer device or other common network node, or any other remote media consumption or transmission device, and may include any or all of the elements described above relative to the computer 1210a. The logical connections depicted in FIG. 12 include a network 1271a, such local area network (LAN) or a wide area network (WAN), but may also include other networks/buses. Such networking environments are commonplace in homes, offices, enterprise-wide computer networks, intranets, and the Internet.

When used in a LAN networking environment, the computer 1210a is connected to the LAN 1271a through a network interface or adapter. When used in a WAN networking environment, the computer 1210a typically includes a communications component, such as a modem, or other means for establishing communications over the WAN, such as the Internet. A communications component, such as a modem, which may be internal or external, may be connected to the system bus 1221a via the user input interface of input 1240a, or other appropriate mechanism. In a networked environment, program modules depicted relative to the computer 1210a, or portions thereof, may be stored in a remote memory storage device. It will be appreciated that the network connections shown and described are exemplary and other means of establishing a communications link between the computers may be used.

While the present innovation has been described in connection with the preferred embodiments of the various Figures, it is to be understood that other similar embodiments may be used or modifications and additions may be made to the described embodiment for performing the same function of the present innovation without deviating therefrom. For example, one skilled in the art will recognize that the present innovation as described in the present application may apply to any environment, whether wired or wireless, and may be applied to any number of such devices connected via a communications network and interacting across the network. Therefore, the present innovation should not be limited to any single embodiment, but rather should be construed in breadth and scope in accordance with the appended claims.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements.

Various implementations of the innovation described herein may have aspects that are wholly in hardware, partly in hardware and partly in software, as well as in software. As used herein, the terms "component," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

Thus, the methods and apparatus of the present innovation, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the innovation. In the case of program code execution on programmable computers, the computing device generally includes a processor, a storage medium readable by the processor (including volatile and non-volatile memory and/or storage elements), at least one input device, and at least one output device.

Furthermore, the disclosed subject matter may be implemented as a system, method, apparatus, or article of manufacture using standard programming and/or engineering techniques to produce software, firmware, hardware, or any combination thereof to control a computer or processor based device to implement aspects detailed herein. The terms "article of manufacture", "computer program product" or similar terms, where used herein, are intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally, it is known that a carrier wave can be employed to carry computer-readable electronic data such as those used in transmitting and receiving electronic mail or in accessing a network such as the Internet or a local area network (LAN).

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components, e.g., according to a hierarchical arrangement. Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In view of the exemplary systems described supra, methodologies that may be implemented in accordance with the disclosed subject matter will be better appreciated with reference to the various flow diagrams. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, not all illustrated blocks may be required to implement the methodologies described hereinafter.

Furthermore, as will be appreciated various portions of the disclosed systems above and methods below may include or consist of artificial intelligence or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent.

While the present innovation has been described in connection with the preferred embodiments of the various figures, it is to be understood that other similar embodiments may be used or modifications and additions may be made to the described embodiment for performing the same function of the present innovation without deviating therefrom.

Although described in an odd/even decomposition, it is not necessarily to be odd/even decomposition for motion information reuse (e.g., 9/7 Wavelet transform, but true for 5/3 and Haar wavelet), but it is applicable for any temporal decomposition algorithms that generate "high-pass and low-pass", which reverses the decoding process during encoding.

While exemplary embodiments refer to utilizing the present innovation in the context of particular programming language constructs, specifications, or standards, the innovation is not so limited, but rather may be implemented in any language to perform the optimization algorithms and processes. Still further, the present innovation may be implemented in or across a plurality of processing chips or devices, and storage may similarly be effected across a plurality of devices. Therefore, the present innovation should not be limited to any single embodiment, but rather should be construed in breadth and scope in accordance with the appended claims.

What is claimed is:

1. A method, comprising:
   determining, by a computing device including a processor, a Temporal Motion Vector (MV) representing an estimated MV for forward prediction, the determining the Temporal MV including summing up backward prediction and reversed forward prediction MVs of a frame; and
   encoding at least one block of a plurality of blocks of a sequence of images as a function of the Temporal MV and a median MV.

2. The method of claim 1, further including:
   determining a Zero block MV, a Left block MV, a Top block MV, a TopRight block MV, and a Future block MV; and
   determining a computational cost associated with at least one of the Zero block MV, the Left block MV, the Top block MV, the TopRight block MV, the Future block MV or the Temporal MV.

3. The method of claim 2, further including:
   setting a position having a lowest sum of absolute luminance differences as a center of refinement for motion compensation.

4. The method of claim 2, further including:
   comparing the computational cost to a first threshold, and terminating motion compensation in response to the computational cost being less than the first threshold.

5. The method of claim 4, further including:
   determining a level of refinement to apply to the encoding of the at least one block.

6. The method of claim 5, further including:
   applying small diamond refinement as the level of refinement in response to the computational cost being greater than the first threshold and less than a second threshold.

7. The method of claim 6, further including:
   applying large diamond refinement as the level of refinement in response to the computational cost being greater than the second threshold.

8. The method of claim 7, further including:
   maintaining values of the first threshold and the second threshold as constants.

9. The method of claim 7, further including:
   adaptively changing values of the first threshold and the second threshold.

10. The method of claim 2, wherein the encoding the at least one block includes encoding as the function of the median MV and the Temporal MV.

11. The method of claim 1, further comprising:
    based on the at least one block, determining a median Motion Vector (MV) for a current block in a current image, based on a Left block leftward of the current block, a Top block above the current block and a TopRight block above and rightward of the current block.

12. A system comprising:
    an encoder, comprising a processor, configured to at least partly encode a plurality of frames including a plurality of odd frames and a plurality of even frames;
    wherein, to at least partly encode the plurality of frames, the encoder is further configured to:
    generate a Temporal Motion Vector (MV) representing an estimated MV for forward prediction, wherein the Temporal MV is obtained at least in part by summing up backward prediction and reversed forward prediction MVs of a frame, and
    encode at least one block as a function of the temporal MV and a median MV.

13. The system of claim 12, wherein the encoder is further configured to:
    generate a motion compensation by use of a prediction operator on one of the odd frames or the even frames to generate a high pass signal,
    generate a low pass signal from the high pass signal,
    generate a median Motion Vector (MV) for a current block in a current image, and
    encode at least one block as a function of the median MV.

14. The system of claim 12, wherein the encoder is further configured to generate a median MV for a current block of a set of blocks represented by the plurality of frames of video data from Left, Top and TopRight blocks with respect to the current block.

15. The system of claim 12, wherein the encoder is further configured to determine a Zero block MV, a Left block MV, a Top block MV, a TopRight block MV, and a Future block MV and to determine a computational cost associated with at least one of the Zero block MV, the Left block MV, the Top block MV, the TopRight block MV, the Future block MV or the Temporal MV.

16. The system of claim 12, wherein the encoder is further configured to set a position with a lowest sum of absolute differences as a center of refinement for the motion compensation.

17. The system of claim 12, wherein the encoder is further configured to determine a level of refinement to apply to the motion compensation.

18. The system of claim 17, wherein the encoder is further configured to apply small diamond refinement as the level of refinement in response to the computational cost being greater than the first threshold and less than a second threshold.

19. The method of claim 18, wherein the encoder is further configured to apply large diamond refinement as the level of refinement in response to the computational cost being greater than the second threshold.

20. The system of claim 12, wherein the encoder is further configured to terminate generation of the motion compensation in response to a computational cost being less than a first threshold.

21. An apparatus, comprising:
means for receiving video data; and
means for determining a Temporal MV representing an estimated MV for forward prediction, wherein the Temporal MV is obtained at least partly by summing up backward prediction and reversed forward prediction MVs of a frame; and
means for encoding at least one block as a function of the Temporal MV and a median MV.

22. The apparatus of claim 21, further comprising:
means for compensating motion using a prediction operator on one of odd frames or even frames of the video data to generate a high pass signal;
means for generating a median Motion Vector (MV) for a current block of the video data based on a Left block of the video data, a Top block of the video data and a TopLeft block of the video data; and
means for encoding at least one block as a function of the median MV.

23. The apparatus of claim 22, wherein the means for compensating motion generates a low pass signal from the high pass signal.

24. The apparatus of claim 21, further comprising means for determining a level of refinement to apply to motion estimation based on comparing a computational cost to at least one threshold.

25. A non-transitory computer-readable storage medium storing computer-executable instructions that, in response to execution, cause a computing system to perform operations, comprising:
for a current block in a sequence of images, determining a temporal motion vector (MV) predictor, representing an estimated motion vector for forward prediction, at least partly by summing at least one backward prediction motion vector and at least one reversed forward prediction motion vector; and
encoding the current block for motion estimation based at least partly on the temporal motion vector predictor as a function of the Temporal MV and a median MV.

\* \* \* \* \*